United States Patent
Huang et al.

(10) Patent No.: US 8,649,348 B2
(45) Date of Patent: Feb. 11, 2014

(54) METHOD, DONOR ENB AND RADIO RELAY SYSTEM FOR REALIZING SERVICE FLOWS TRANSMISSION OF MOBILE TERMINAL

(75) Inventors: Yada Huang, Shenzhen (CN); Dapeng Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 122 days.

(21) Appl. No.: 13/379,015

(22) PCT Filed: Jun. 21, 2010

(86) PCT No.: PCT/CN2010/074155
§ 371 (c)(1),
(2), (4) Date: Dec. 17, 2011

(87) PCT Pub. No.: WO2010/149005
PCT Pub. Date: Dec. 29, 2010

(65) Prior Publication Data
US 2012/0093070 A1   Apr. 19, 2012

(30) Foreign Application Priority Data
Jun. 22, 2009  (CN) .......................... 2009 1 0147396

(51) Int. Cl.
*H04W 4/00* (2009.01)
*H04J 3/08* (2006.01)
*H04L 12/28* (2006.01)
*H04L 12/56* (2011.01)

(52) U.S. Cl.
USPC ....................... 370/329; 370/315; 370/395.21

(58) Field of Classification Search
USPC .............................. 370/315, 328, 329, 395.21
See application file for complete search history.

(56) References Cited

U.S. PATENT DOCUMENTS

| 2005/0013277 A1* | 1/2005 | Marque-Pucheu ........... 370/336 |
| 2005/0141560 A1* | 6/2005 | Muthiah ....................... 370/474 |
| 2008/0080436 A1* | 4/2008 | Sandhu et al. ................ 370/338 |

FOREIGN PATENT DOCUMENTS

| CN | 101141172 A | 3/2008 |
| CN | 101267240 A | 9/2008 |

OTHER PUBLICATIONS

International Search Report for PCT/CN2010/074155 dated Sep. 10, 2010.

* cited by examiner

*Primary Examiner* — Ronald Abelson
(74) *Attorney, Agent, or Firm* — Ling Wu; Stephen Yang; Ling and Yang Intellectual Property (57) ABSTRACT

A method, donor eNB and radio relay system for realizing service flow transmission of a terminal are disclosed in the present invention. Wherein a relay station is connected to the donor eNB through a backhaul link, and a scheme for transmitting the service data flow on the backhaul link is: the relay station and the donor eNB transmit each service data flow of each UE on a logical channel set by the donor eNB, thereby when the Relay is configured as a scheduled entity in a Un interface, the problem that the QoS requirement of each service of UE of the Relay can not be satisfied is resolved, so that when the Relay is configured to be a scheduled entity in a Un interface, the QoS requirement of each service of UE of the relay can be satisfied.

12 Claims, 9 Drawing Sheets

METHOD, DONOR ENB AND RADIO RELAY SYSTEM FOR REALIZING SERVICE FLOWS TRANSMISSION OF MOBILE TERMINAL

TECHNICAL FIELD

The present invention relates to a cellular wireless communication system, especially to a method, donor eNB and radio relay system for realizing service flow transmission of a terminal.

BACKGROUND OF THE RELATED ART

Figure 1:
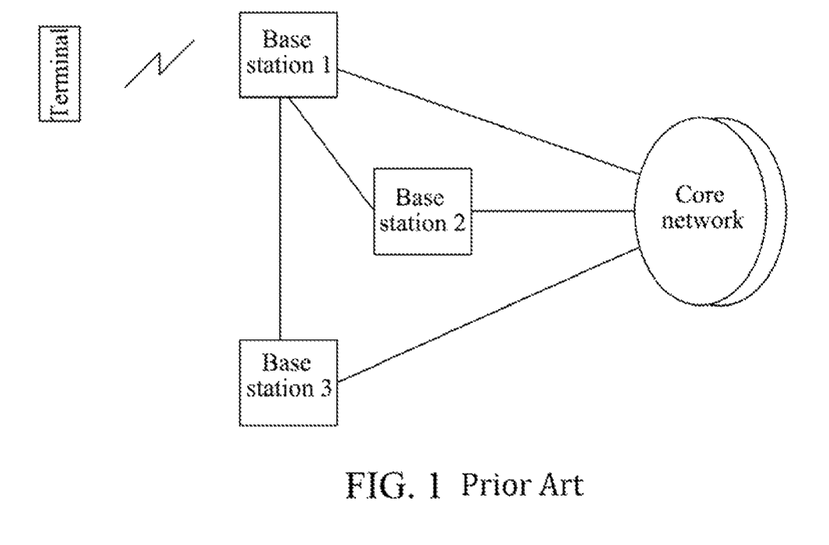
FIG. 1 is a structural diagram of a cellar wireless communication system in prior art.

As shown in FIG. 1, a cellular wireless communication system is mainly composed of Core Network (CN), Radio Access Network (RAN), and terminals. Core Network is responsible for non-access stratum transaction, for instance, the updating of the location of a terminal, and is the anchor of user plane. RAN comprises eNB, or eNB and eNB controller, and the RAN is responsible for access stratum transaction (for instance, the management of radio resources), there can be a physical and logical connection between eNBs, such as the connection between eNB 1 and eNB 2 or eNB 3 as shown in FIG. 1, and each eNB can connect to one or more CN nodes. The terminal, i.e. User Equipment (UE), refers to various equipments which can communicate with cellular wireless communication network, for example, mobile phone or laptop, etc.

Figure 2:
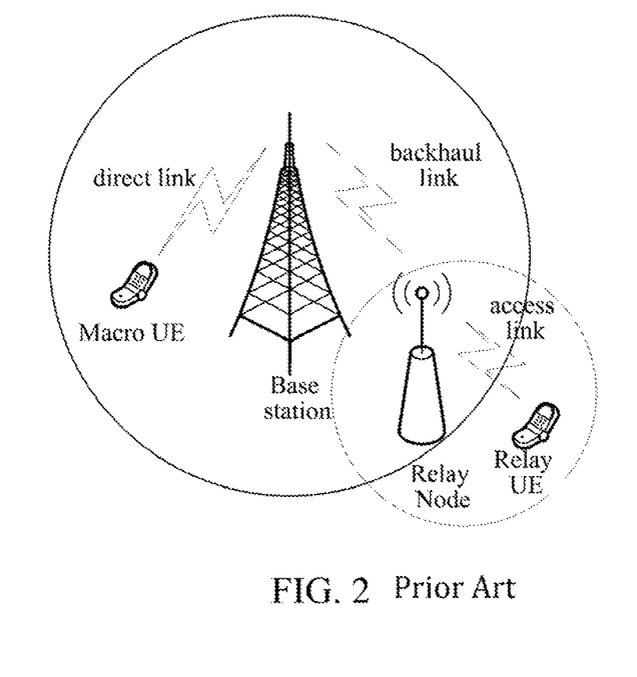
FIG. 2 is a diagram of network architecture with a relay being added in prior art.

In cellular wireless communication system, the wireless coverage of fixed eNB network is limited because of various reasons, for example, various kinds of building constructions blocking the radio signal causes the inevitable coverage leak in the coverage of wireless network. In addition, in the marginal area of a cell, the weakening of radio signal intensity and the interference of the neighboring cell result in the poor quality of communication and the increasing of the error rate of wireless transmission when the terminals are in the marginal area of the cell. In order to increase throughput of data transmission, group mobility, temporary network deployment, throughput of the marginal area of the cell and coverage of a new area, a solution is to introduce a wireless network node, which is called relay, into the cellular wireless communication system. As shown in FIG. 2, Relay is the station which has the function of communicating data and possible control information through wireless link between the other network nodes, also called Relay Node/Relay Station. UE directly served by eNB is called Macro UE, UE served by Relay is called Relay UE.

The definition of the interfaces between all network elements is as follows:

direct link: the wireless link between eNB and Macro UE comprises downlink/uplink(DL/UL) direct link, called Uu interface.

access link: the link between Relay and Relay UE, comprising DL/UL access link, also being Uu interface.

backhaul link: the wireless link between eNB and Relay, comprising DL/UL relay link, called Un interface.

UE cannot distinguish the cells under the control of the Relay and the fixed eNB, from the view of UE, the cell under the direct control of eNB (called ordinary cell) does not have differences from the cell under the control of the Relay (called relay cell). Relay cell has its own Physical Cell Identifier (PCI), and sends the broadcast like a ordinary cell does, when UE stays in the relay cell, the relay cell can assign and schedule wireless resources to UE by itself, can be independent of the scheduling of wireless resources of eNB involved the relaying, the eNB involved the relaying is called Donor eNB, i.e. the eNB which is connected to Relay by backhaul link. The interface and protocol stack between relay cell and relay UE are the same as those between ordinary cell and Macro UE.

Figure 3:
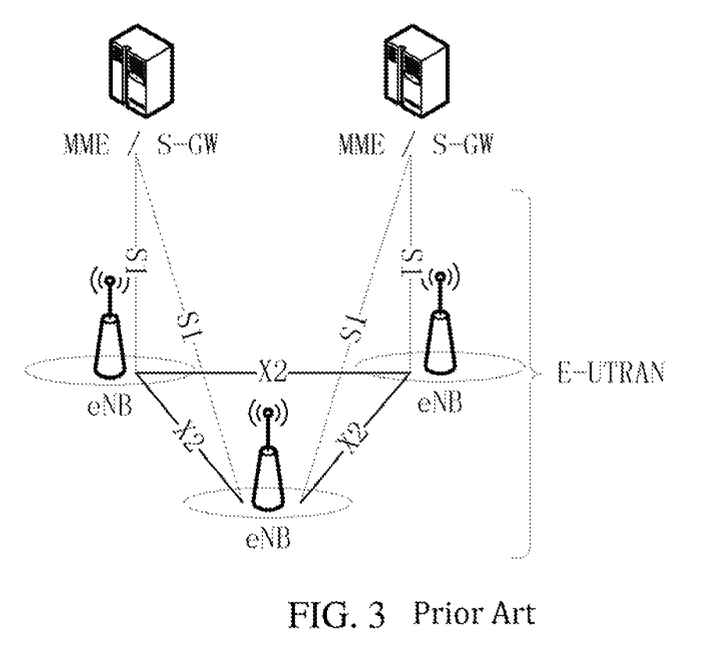
FIG. 3 is a diagram of LTE network architecture in prior art.

Long Term Evolution-based (LTE) cellular wireless communication system can adopt the flat structure based on Internet Protocol (IP). As shown in FIG. 3, LTE cellular wireless communication system is composed of Evolved Universal Terrestrial Radio Access Network (E-UTRAN) and CN node. Wherein CN node comprises mobility management Entity (MME), servicing gateway (S-GW). MME is responsible for the work related to the control plane, for example, the mobility management, the processing of non access stratum signaling, the management of mobility management context of user, etc; S-GW is responsible for the transportation, forwarding and routing handover of UE user plane data and so on. E-UTRAN comprises eNB, the eNBs are inter-connected through X2 interface logically, which is used for supporting the mobility of UE in the whole network to ensure the seamless handover.

Figure 4:
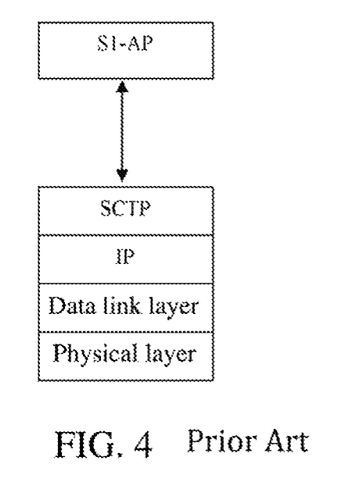
FIG. 4 shows a S1-MME interface protocol stack in prior art.
Figure 5:
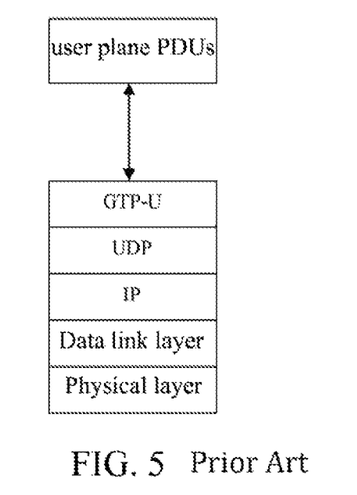
FIG. 5 shows a S1-U interface protocol stack in prior art.

Each eNB is connected to system architecture evolution (SAE) CN through S1 interface, S1 interface supports the multipoint connection between eNB and MME, S-GW, eNB is connected to MME through control plane S1-MME interface. S1-MME interface protocol stack is shown in FIG. 4; its network layer adopts IP, the transmission layer above the network layer uses stream control transmission protocol (SCTP), the top application layer (i.e. control plane) uses the transmission bearer of the bottom layer to transmit the signaling of S1-AP.

each eNB is connected to S-GW through user plane S1-U interface, the interface protocol stack of S1-U is shown in FIG. 5, the transmission bearer is composed of GTP-U/UDP/IP, and is used for transmitting the user plane protocol data unit (PDU) between eNB and S-GW. The Tunnel Endpoint Identifier (TEID) of GTP-U and the IP address identifier transmission bearer comprise: source GTP-U TEID, destination GTP-U TEID, source IP address and destination IP address, wherein, the UDP port number is fixed as 2152, while GTP-U is a tunnel protocol for seamless transmission of IPv4 and IPv6. Each transmission bearer is used for bearing Service Data Flows.

Figure 6:
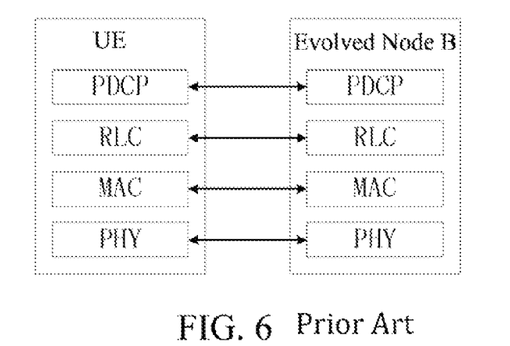
FIG. 6 shows a structure of a protocol stack of air interface between a eNB and a UE in a Uu user plane in prior art.
Figure 7:
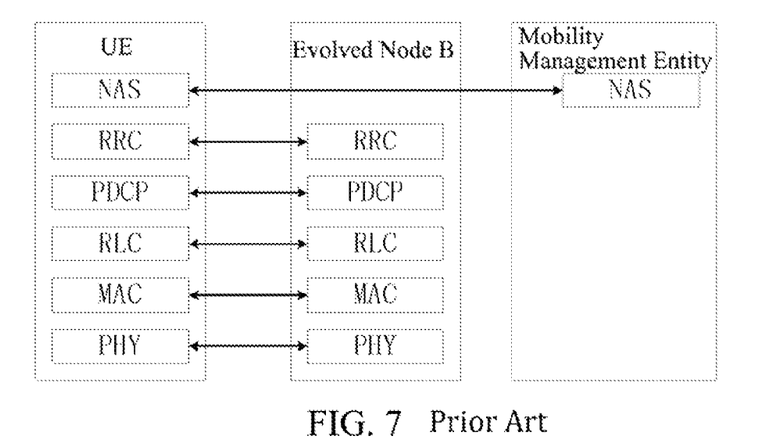
FIG. 7 shows a structure of a protocol stack of air interface between an eNB and a UE in a Uu controlling plane in prior art.

Each eNB transmits signaling and data with UE through Uu interface (which is originally defined as the wireless interface between UTRAN and UE). FIG. 6 and FIG. 7 show the air interface protocol stack between eNB and UE from the user plane and the control plane. The user plane from top to down is Physical Layer (PHY), Medium Link Control (MAC), Radio Link Control (RLC) and Packet Data Convergence Protocol (PDCP) respectively. Above the lowest lay (i.e. the physical lay), MAC is responsible for the mapping from the logical channel to the transmission channel and the process of multiplexing/demultiplexing the data, the scheduling of physical resource of the bottom layer, and hybrid ARQ of data packet, etc. RLC layer ensures the data to be transmitted reliably and orderly, and finishes the process of multiplexing/demultiplexing the upper layer data packet by the method of ARQ and so on. PDCP layer is responsible for the header compression of IP data packet, and the encrypting/decrypting and the integrity protection of the data packet and etc. The control plane uses the bearing of user plane, which is called Radio Bearer in Uu interface, to transmit the signaling of the control plane, i.e. the signaling of RRC layer. RRC layer and the all the layers below it are called Access Stratum, finishing the access bearer between UE and access network, and after accessing, the access stratum can bear the signaling of Non Access Stratum (NAS).

Figure 8:
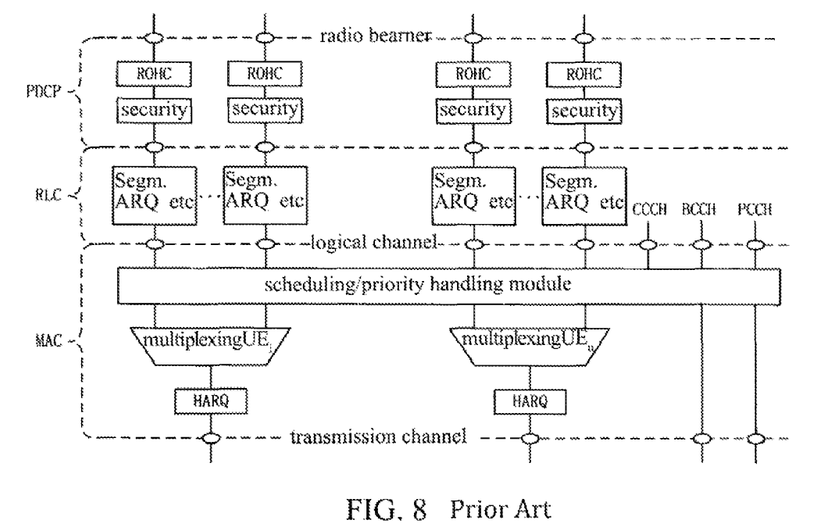
FIG. 8 is a schematic diagram of MAC/RLC/PDCP in the relay in prior art.
Figure 9:
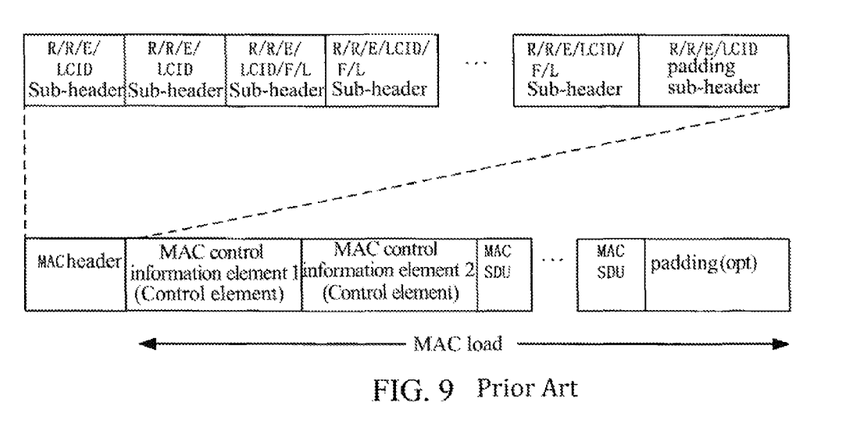
FIG. 9 is a schematic diagram of MAC PDU format in MAC layer in the relay in prior art.
Figure 10:
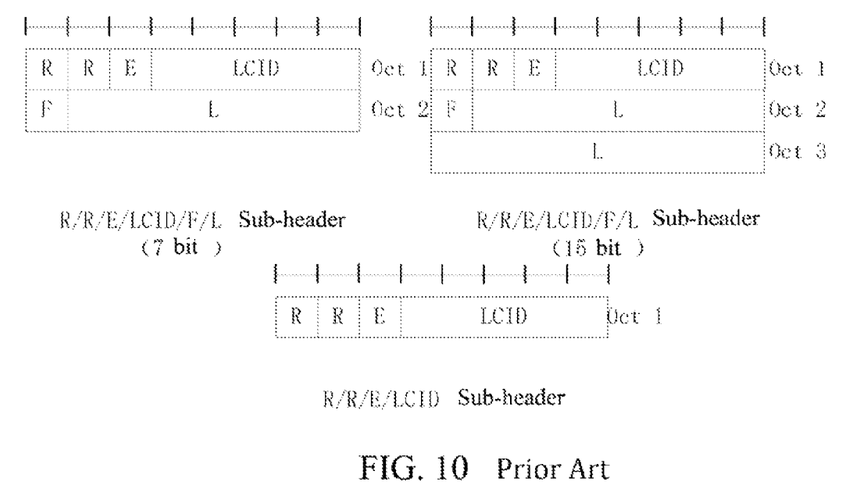
FIG. 10 is a schematic diagram of MAC sub-header format in MAC PDU in the relay in prior art.

MAC/RLC/PDCP protocol layer works as shown in FIG. 8, wherein the Scheduling/Priority Handling module of MAC layer mainly multiplexes the Service Data Units (SDU) from one or more logical channels to the Transport Blocks (TB) of the transmission channel. MAC chooses scheduling resources according to the Quality of Service (QoS) of the service transmission on the logical channel. The specific parameters of QoS are composed of QoS class identifier (QCI), Allocation and Retention Priority (ARP), Guaranteed Bit Rate (GBR) and Maximum Bit Rate (MBR). QCI identifies a set of standard QoS parameters, including priority, Packet Delay Budget (PDB) and Packet Error Loss Rate. Most of QoS parameters need to be guaranteed by scheduling priority processing module of MAC. The PDU format of MAC is shown in FIG. 9, the PDU is composed of MAC header and MAC load, MAC header is composed of a number of MAC sub-headers, the transmission content at the corresponding location of each sub-header identifier in MAC load can be MAC Control Element (CE) or SDU coming from logical channel. There are 3 types of Sub-header, as shown in FIG. 10, wherein E indicates whether there is a sub-header after the present MAC sub-header, if there is no sub-header, then the following is MAC load. For SDU in the MAC load, the Logical Channel Identifier (LCID) carried in the sub-header identifies the logical channel which the SDU comes from, and L identifies the length of this SDU.

The different service flows of UE have different QoSs, the different QoS services between UE and Packet Gateway (termed as PGW) are borne by the different Evolved Packet System bearer (EPS bearer), In the access network system of LTE, EPS bearer is borne by the bearer service unit of E-UTRAN Radio Access Bearer (E-RAB). In LTE system, E-RAB bears with two sections, one is Radio Bearer between UE and eNB, the other is S1 Bearer between eNB and S-GW. The transmission borne by both these two sections satisfies the QoS requirement of E-RAB. For the radio bearer on Uu, the QoS of one E-RAB is guaranteed by the scheduling/priority handling module of MAC, for example, the GBR requirement of E-RAB make MAC guarantees that the data rate of E-RAB is not lower than GBR when scheduling. In addition, for example, the requirement of Packet Delay Budget in QCI requires that 98% of the data should be transmitted in the time defined by PDB, so MAC needs to satisfy the requirement of PDB when scheduling.

In the scene of including a Relay, on Un interface, a single connection is established between the Relay and the Donor eNB, all services of all UEs of this Relay will be borne on this connection. The scheduling for the original service of UE can only satisfy the scheduling requirement of UE, for the Relay which carries a large amount of UEs, the scheduling of these UEs will be combined to be a scheduling for one Relay. On Un interface, Relay which is configured as the scheduled entity cannot satisfy the QoS requirement of each service of UE of the Relay.

SUMMARY OF THE INVENTION

The technical problem to be solved of the present invention is to provide a method, donor eNB and radio relay system for realizing service flow transmission of a terminal, when using the relay as the entity to be scheduled, the QoS requirement of each service of UE of the relay is satisfied.

To solve the problem above, a transmission method of service flow of a UE is provided by the present invention, comprising: a relay station is connected to a donor eNB through a backhaul link, and a transmission scheme of the service data flow on the backhaul link is: the relay station and the donor eNB transmit each service data flow of each UE on a logical channel configured by the donor eNB.

Preferably, the method above further has the following characteristics:

before the step of the relay station and the donor eNB transmitting each service data flow of each UE on a logical channel configured by the donor eNB, the method further comprises: the donor eNB allocates a logical channel for each service data flow of each UE of the relay station.

Preferably, the method above further has the following characteristics:

the step of the relay station and the donor eNB transmitting each service data flow of each UE on a logical channel configured by the donor eNB further comprises: the donor eNB and the relay station schedules service data flow on each logical channel according to Quality of service (QoS) requirement of service data flow corresponding to each logical channel.

Preferably, the method above further has the following characteristics:

different service data flows of each UE of the relay station correspond to the logical channel one by one, and a logical channel identifier is a combination of a UE identifier and a service identifier.

Preferably, the method above further has the following characteristics:

the step of the relay station and the donor eNB transmitting each service data flow of each UE on a logical channel configured by the donor eNB comprises: the base station or the relay station sends the service data flow by means of Medium Access Control packet data unit, a structure of the Medium Access Control packet data unit is one of the following structures: a Medium Access Control sub-header in the Medium Access Control packet data unit carries the logical channel identifier, a service data unit corresponding to the Medium Access Control sub-header carries service data flow on a logical channel corresponding to the logical channel identifier; the Medium Access Control sub-header in the Medium Access Control packet data unit comprises a UE sub-header and a service sub-header, the UE sub-header carries the UE identifier, the service sub-header carries the service identifier, a service data unit corresponding to the Medium Access Control sub-header carries service data flow on a logical channel corresponding to the UE identifier and the service identifier; and the Medium Access Control sub-header in the Medium Access Control packet data unit carries UE identifier, a service data unit corresponding to the Medium Access Control sub-header carries the service identifier of UE indicated by the UE identifier, the length of service data flow corresponding to the service identifier, and service data flow.

Preferably, the method above further has the following characteristics:

the step of the donor eNB allocating one logical channel for each service data flow of each UE of the relay station comprises: the donor eNB maps one or more different service data flows with the QoS requirement being in the identical QoS scope to the identical logical channel.

Preferably, the method above further has the following characteristics:

the step of the donor eNB and the relay station scheduling the service data flow on each logical channel according to the QoS requirement of service data flow corresponding to each logical channel comprises: the donor eNB and the relay station schedules the service data flow on each logical channel according to the QoS scope corresponding to each logical channel.

Preferably, the method above further has the following characteristics:

the step of the relay station and the donor eNB transmitting each service data flow of each UE on a logical channel configured by the donor eNB comprises: the base station or the relay station sends the service data flow by means of Medium Access Control packet data unit, a structure of the Medium Access Control packet data unit is as below: the service data unit in the Medium Access Control packet data unit carries a QoS scope identifier and the service data flow with QoS requirement being in the scope of QoS indicated by the QoS scope identifier.

To solve the technical problem above, a donor eNB is provided by the present invention, which is connected to a relay station through a backhaul link, comprising:

a setting module, which is configured to set a logical channel on the backhaul link for each service data flow of each UE of the relay station; and a transmission module, which is connected to the setting module, and is configured to transmit each service data flow of each UE on the set logical channel.

Preferably, the donor eNB above further has the following characteristics:

the setting module comprises: a first allocating sub-module, which is configured to allocate a logical channel for each service data flow of each UE of the relay station, so that different service data flows of each UE of the relay station correspond to the logical channels one by one, and the logical channel identifier is a combination of a UE identifier and a service identifier;

the transmission module comprises: a first scheduling sub-module, which is configured to schedule the service data flow on each logical channel in medium access control according to the QoS requirement of service data flow corresponding to each logical channel.

Preferably, the donor eNB above further has the following characteristics:

the transmission module further comprises: a first sending module, which is configured to send the service data flow by means of Medium Access Control packet data unit, wherein a structure of the Medium Access Control packet data unit is one of the following structures:

a Medium Access Control sub-header in the Medium Access Control packet data unit carries the logical channel identifier, a service data unit corresponding to the Medium Access Control sub-header carries a service data flow on a logical channel corresponding to the logical channel identifier;

a Medium Access Control sub-header in the Medium Access Control packet data unit comprises a UE sub-header and a service sub-header, the UE sub-header carries the UE identifier, the service sub-header carries the service identifier, a service data unit corresponding to the Medium Access Control sub-header carries the UE identifier and the service data flow on a logical channel corresponding to the service identifier; and a Medium Access Control sub-header in the Medium Access Control packet data unit carries a UE identifier, a service data unit corresponding to the Medium Access Control sub-header carries the service identifier of UE indicated by the UE identifier, the length of service data flow corresponding to the service identifier, and the service data flow.

Preferably, the donor eNB above further has the following characteristics:

the setting module further comprises: a second allocating sub-module, which is configured to allocate a logical channel for each service data flow of each UE of the relay station, and map one or more different service data flows with the QoS requirement being within the identical QoS scope to the identical logical channel;

the transmission module comprises: a second scheduling sub-module, which is configured to schedule the service data flow on each logical channel according to QoS scope corresponding to each logical channel in packet data convergence layer.

Preferably, the donor eNB above further has the following characteristics:

the transmission module further comprises: a second sending module, which is configured to send the service data flow by means of Medium Access Control packet data unit, a structure of the Medium Access Control packet data unit is as below: a service data unit in the Medium Access Control packet data unit carries QoS scope identifier and the service data flow with the QoS requirement being within the QoS scope indicated by the QoS scope identifier.

To solve the technical problem above, a radio relay system for realizing service flow transmission of a terminal is provided by the present invention, comprising a donor eNB and a relay station which are connected through a backhaul link; wherein, the donor eNB is configured to set a logical channel on the backhaul link for each service data flow of each UE of the relay station, and transmit each service data flow of each UE on the set logical channel; and the relay station is configured to transmit each service data flow of each UE on the logical channel set by the donor eNB.

Preferably, the radio relay system above further has the following characteristics:

the donor eNB is further configured to: allocate a logical channel for each service data flow of each UE of the relay station, and schedule the service data flow on each logical channel in medium access control according to QoS requirement of the service data flow corresponding to each logical channel; different service data flows of each UE of the relay station correspond to the logical channels one by one, and a logical channel identifier is a combination of a UE identifier and a service identifier; the relay station is further configured to schedule the service data flow on each logical channel according to the QoS requirement of service data flow corresponding to each logical channel.

Preferably, the radio relay system above further has the following characteristics:

the eNB and the relay station is further configured to send the service data flow by means of Medium Access Control packet data unit; a structure of the Medium Access Control packet data unit is one of the following structures: a Medium Access Control sub-header in the Medium Access Control packet data unit carries the logical channel identifier, a service data unit corresponding to the Medium Access Control sub-header carries the service data flow on a logical channel corresponding to the logical channel identifier; a Medium Access Control sub-header in the Medium Access Control packet data unit comprises a UE sub-header and a service sub-header, the UE sub-header carries the UE identifier, the service sub-header carries the service identifier, a service data unit corresponding to the Medium Access Control sub-header carries the UE identifier and the service data flow on a logical channel corresponding to the service identifier; and a Medium Access Control sub-header in the Medium Access Control packet data unit carries UE identifier, a service data unit corresponding to the Medium Access Control sub-header carries the service identifier of UE indicated by the UE identifier, the length of service data flow corresponding to the service identifier, and the service data flow.

Preferably, the radio relay system above further has the following characteristics:

the donor eNB and the relay station is further configured to map one or more different service data flows with the QoS requirement being in the identical QoS scope to the identical logical channel, schedule the service data flow on each logical channel according to the QoS scope corresponding to each logical channel in packet data convergence layer.

Preferably, the radio relay system above further has the following characteristics:

the donor eNB and the relay station are further configured to send the service data flow by means of Medium Access Control packet data unit, a structure of the Medium Access Control packet data unit is as below: the service data unit in the Medium Access Control packet data unit carries a QoS scope identifier and the service data flow with the QoS requirement being in the QoS scope indicated by the QoS scope identifier.

In the system which introduces the relay in the present invention, when using the relay as the entity to be scheduled, the QoS requirement of each service of UE of the relay is met.

PREFERRED EMBODIMENTS OF THE PRESENT INVENTION

Figure 11:
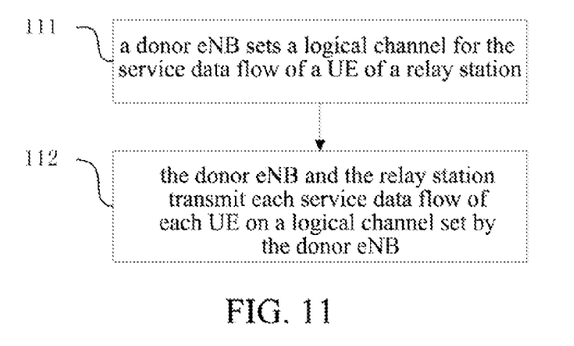
FIG. 11 is a flow chart of a method for realizing service flow transmission of a UE in the embodiments of the present invention.

As shown in FIG. 11, the method for realizing the service flow transmission of UE comprises:

step 111: the donor eNB sets a logical channel for the service data flow of a UE of the relay station;

step 112: the relay station and the donor eNB transmit each service data flow of each UE on a logical channel set by the donor eNB.

Embodiment One:

the donor eNB allocates a logical channel for each service data flow of each UE of the relay station, makes the different service data flows of the UE correspond to the logical channels one by one, and the identifier of the logical channel is compounded by the UE identifier and the service identifier (i.e. UE ID+UE service ID). UE ID can be an internal ID used on a Un interface, the different UEs of the relay station have different IDs, for example, it can be the Cell Radio Network Temporary Identifier (C-RNTI) of the UE of the relay station, UE service ID represents the different services in a UE, for example, it can be EPS ID or E-RAB ID.

In the prior art, the maximum number of the logical channels of each UE corresponding to the eNB on Un interface is 16, in the present invention, through the identifier mode above, each logical channel corresponds to a service data flow, not simply the number of the logical channels is enlarged, but also the original single logical channel identifier is extended to a 2-layer structure, thus more logical channels are also supported to transmit the data, and it is to facilitate the management of the data of the logical channel and to decrease the logical channel identifier expenses.

Figure 12:
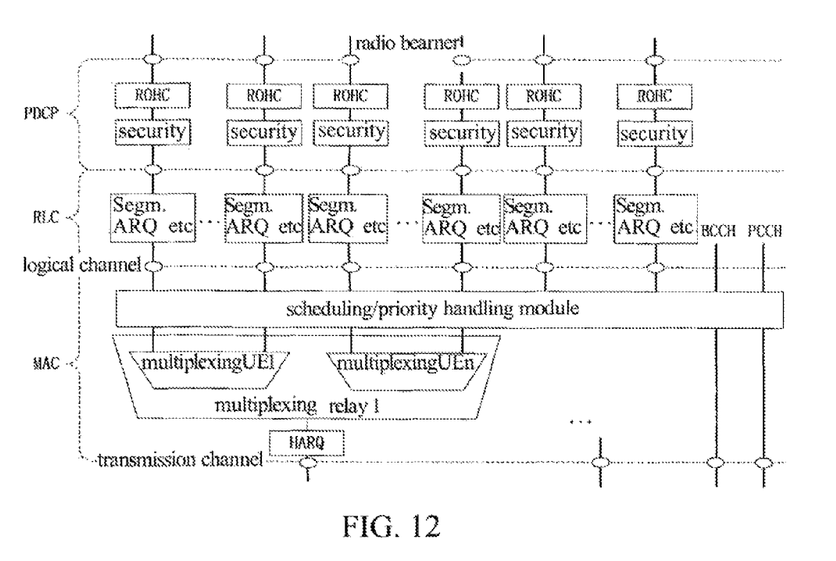
FIG. 12 is a schematic diagram of the donor eNB and the relay station at MAC/RLC/PDCP layer in embodiment one of the present invention.

As shown in FIG. 12, the service of each UE (which can correspond to a E-RAB or EPS bearer), as a data flow with the QoS requirement, owns the separate PDCP and RLC entities (a set of PDCP/RLC entities is bounded to one logical channel of MAC layer), each data flow accesses to MAC through its corresponding logical channel.

After the donor eNB schedules the data of each logical channel, it still needs to send the data of all UEs of the relay to the relay station on Un interface with the format of MAC PDU. The structure of MAC PDU is one of the followings:

(1) the structure of MAC PDU as shown in FIG. 9:

the MAC sub-header in MAC PDU carries the logical channel identifier, and MAC SDU corresponding to the MAC sub-header carries the service data flow of the logical channel corresponding to the logical channel identifier.

Like the PDU structure of MAC on LTE Uu interface, only the number of logical channel needs to be enlarged to satisfy the requirement of supporting the number of UEs of the relay station.

Figure 13:
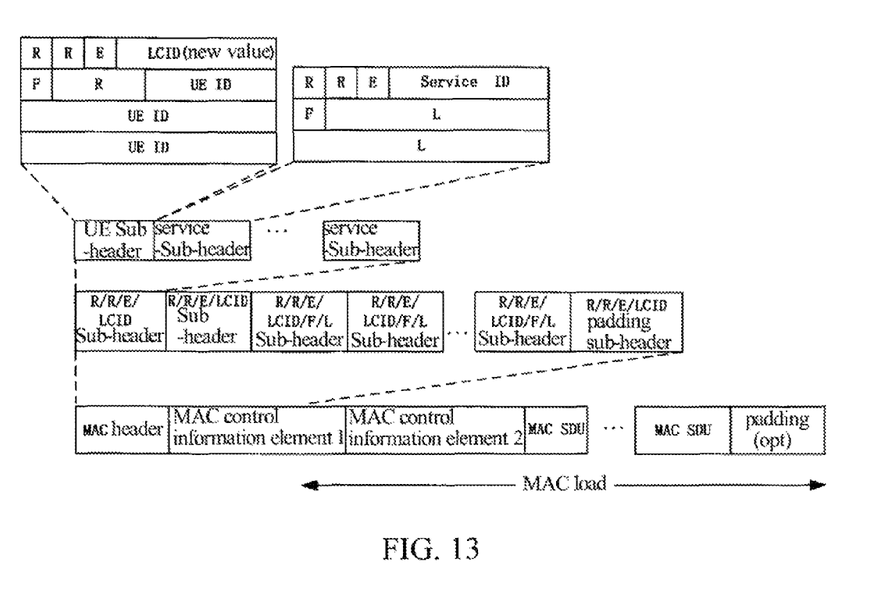
FIG. 13 is a schematic diagram of MAC PDU format one in embodiment one of the present invention.

(2) the structure of MAC PDU as shown in FIG. 13:

designing a new MAC sub-header, the MAC sub-header of MAC PDU comprises the UE sub-header and the Service sub-header, the UE sub-header carries UE ID, and carries some other information, for example, the number of UE Services, etc; the Service sub-header carries the information characterizing the service, for example, Service ID and the length of service data block. Considering the compatibility design, it still keeps the R/R/E/LCID format in the original MAC sub-header, and it only uses the new LCID, so as to make a difference from the original MAC sub-header. The relative position of the service data block identified by the MAC sub-header in the MAC load is the same as the relative position of MAC sub-header in MAC header. The ID of the logical channel is indicated by the combination of the UE ID and the Service identifier, and an SDU corresponding to MAC sub-header carries the service data flow corresponding to the logical channel.

Figure 14:
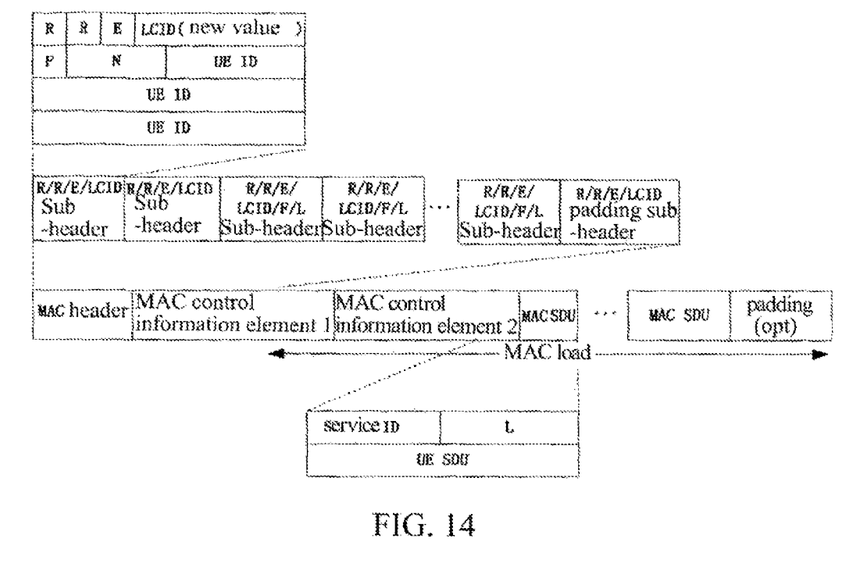
FIG. 14 is a schematic diagram of MAC PDU format two in embodiment one of the present invention.

(3) the structure of MAC PDU as shown in FIG. 14:

the MAC sub-header of MAC PDU only carries the data characterizing the UE, including UE ID, the number of the services, etc, the SDU corresponding to the MAC sub-header carries the service data of UE indicated by the UE ID, it can be one or more service packets, each service packet is composed of Service identifier and the service data flow and the length L of service data flow corresponding to the service identifier. (Through the data header in MAC SDU, including Service ID and the length L of the service packet, MAC SDU is split into the data of different services).

The mapping relation of the service data flow and the logical channel above is determined by donor eNB, specifically, it can be UE corresponding to UE ID and E-RAB or EPS bearer corresponding to Service ID, and by the control plane of Un interface, for example, RRC signaling, it is informed to the relay station; when updating/deleting the mapping relation of the service data flow and the logical channel, a donor eNB also informs the relay station the updating/deleting of service. When the donor eNB and the relay station schedule on the MAC layer, they both perform pointed scheduling to satisfy the service requirement according to the QoS requirement of the service data flow, and when sending the service flow data, they both send according to the mapping relation and the structure of MAC PDU.

In the present scheme, when a new UE accesses to a relay station or a UE of the relay station initiates a new service, that is to say, when a service flow is newly added, the PDCP/RLC entity in the bottom layer can bear the service by creating a new set of entities, i.e. creating a new logical channel to transmit the service flow. Similarly, when UE quits from the relay station or a UE of the relay station terminates one service, the corresponding PDCP/RLC entity which bears the service flow is released for the bottom layer, that is to say, the corresponding logical channel is deleted.

Figure 15:
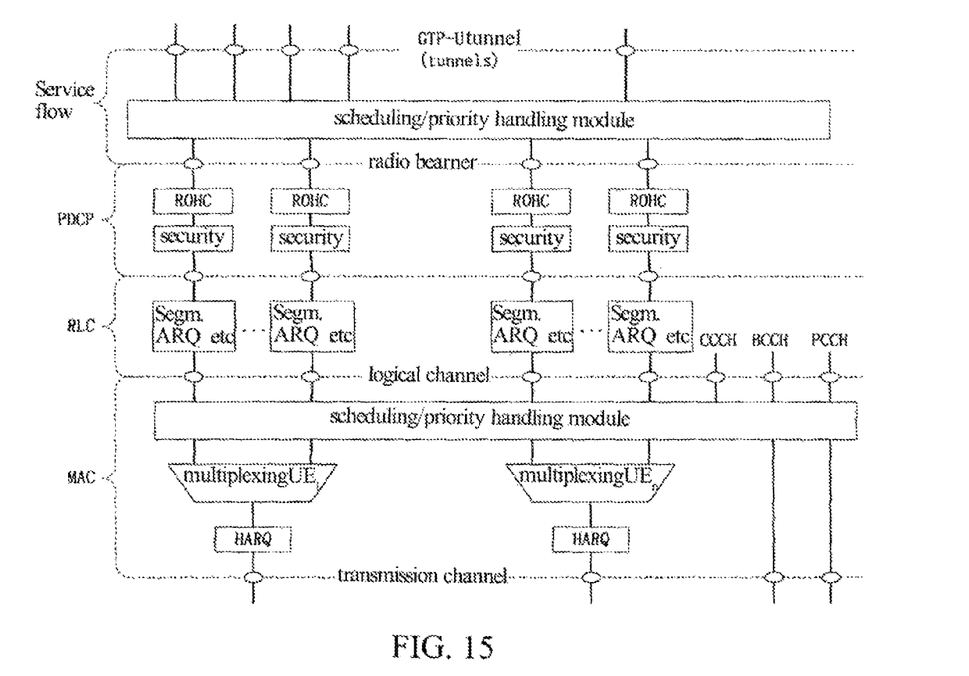
FIG. 15 s a schematic diagram of the donor eNB and the relay station at MAC/RLC/PDCP layer in embodiment two of the present invention.

Embodiment Two:

As shown in FIG. 15, in the PDCP module, the donor eNB maps one or more different service data flows with the quality of service requirement being in the identical quality of service scope to the identical logical channel, that is to say, a priority scheduling is performed for the service data flow of each UE, the scheduling is responsible for finishing the priority between the different services of different UEs, but it does not relate to the problem of allocating all physical resources for this service.

The quality of service scope is determined by the donor eNB, which can be made according to the various parameter values of QoS parameters, for example, QoS can be the same, or the rule that QCIs are identical in QoS maps multiple service data flows to the identical logical channel, to make the number of the logical channels on the follow-up MAC layer less than that in embodiment one so as to decrease processing amount of the following MAC layer scheduling/priority process module for scheduling the logical channel data.

After scheduled, the different service data of different UE will carry the corresponding identifiers, so as to distinguish the service in an identical logical channel. For example, it can be TEID identifier relating to GTP-U protocol or the combined identifier of UE ID and Service ID as described in embodiment one.

The identifier of the logical service channel in embodiment two is different from that in embodiment one (the combination of UE ID and Service ID), the identifier of the logical service channel in embodiment two can be global overall identifier, after confirmed by the donor eNB, it is informed to the relay station by the control plane RRC signaling on Un interface, or by the signaling on the upper layer for establishing UE service, for example, NAS signaling, to inform the relay station.

The way for scheduling the data on each logical channel by the following MAC layer scheduling/priority process module according to the corresponding quality of service scope corresponding to each logical channel is the same as that in embodiment one, and will not be repeated here. In the other variations of the examples of embodiment two, the MAC layer scheduling/priority process may not be performed any more.

Figure 16:
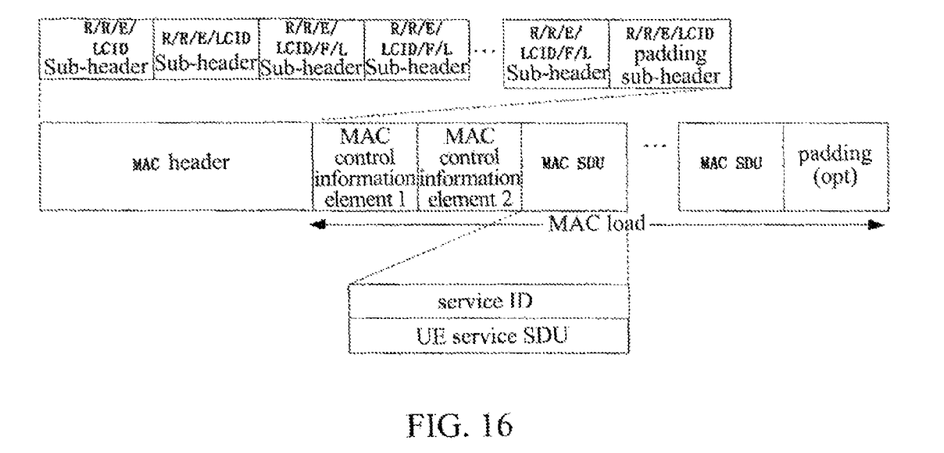
FIG. 16 is a schematic diagram of MAC PDU format in embodiment two of the present invention.

The said eNB or the said relay station sends the service flow data by means of MAC packet data unit, the structure of the MAC packet data unit is shown in FIG. 16: the service data unit SDU of the MAC packet data unit carries the quality of service scope identifier and the service data flow with the QoS requirement being in the quality of service scope indicated by the quality of service identifier.

Figure 17:
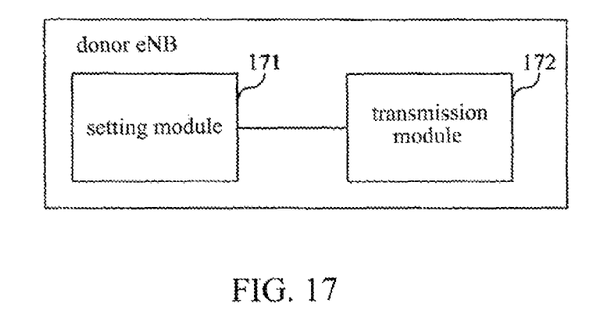
FIG. 17 is a structural schematic diagram of the donor eNB in an embodiment of the present invention.

As shown in FIG. 17, in the embodiment of the present invention, the donor eNB 17 is connected to the relay station by a backhaul link, the donor eNB 17 comprises: a setting module 171, which is configured to set a logical channel on the backhaul link for each service data flow of each UE of the relay station; and a transmission module 172, which is connected to the setting module, and is configured to transmit each service data flow of each UE on the set logical channel.

Figure 18:
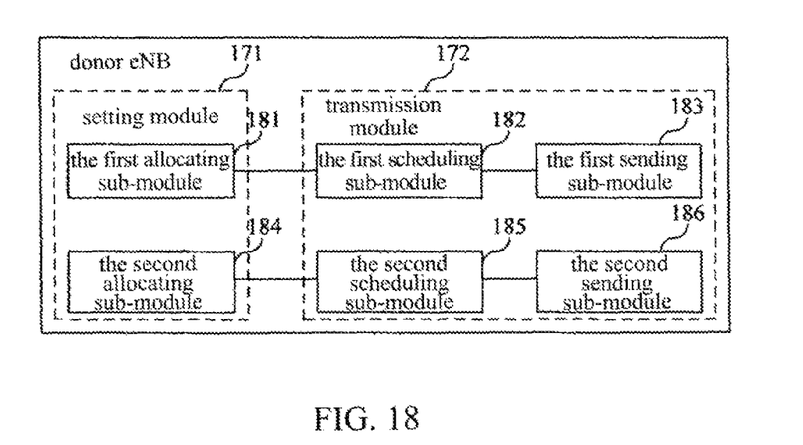
FIG. 18 is another structural schematic diagram of the donor eNB in an embodiment of the present invention.

As shown in FIG. 18, in the embodiment of the present invention, the donor eNB comprises the setting module 171 and the transmission module 172 of the donor eNB, as shown in FIG. 17.

The said setting module 171 can comprise: a first allocating sub-module 181, which is configured to allocate a logical channel for each service data flow of each UE of the relay station, so that different service data flows of each UE of the relay station correspond to the logical channels one by one, and a logical channel identifier is a combination of a UE identifier and a service identifier. The said transmission module 172 can comprise: a first scheduling sub-module 182, which is configured to schedule the service data flow on each logical channel in medium access control according to a QoS requirement of the service data flow corresponding to each logical channel. The said transmission module 172 still can comprise: a first sending module 173, which is configured to send the service data flow by means of Medium Access Control packet data unit, wherein a structure of the Medium Access Control packet data unit is one of the following structures: a Medium Access Control sub-header in the Medium Access Control packet data unit carrying the logical channel identifier, a service data unit corresponding to the Medium Access Control sub-header carrying the service data flow on the logical channel corresponding to the logical channel identifier; the Medium Access Control sub-header in the Medium Access Control packet data unit comprising a UE sub-header and a service sub-header, the UE sub-header carrying the UE identifier, the service sub-header carrying the service identifier, a service data unit corresponding to the Medium Access Control sub-header carrying the service data flow on the logical channel corresponding to the UE identifier and the service identifier; and a Medium Access Control sub-header in the Medium Access Control packet data unit carrying a UE identifier, a service data unit corresponding to the Medium Access Control sub-header carrying the service identifier of the UE indicated by the UE identifier and the service data flow and the length of service data flow corresponding to the service identifier.

The said setting module 171 still can comprise: a second allocating sub-module 184, which is configured to allocate a logical channel for each service data flow of each UE of the relay station, and map one or more different service data flows with the QoS requirement being within the identical QoS scope to the identical logical channel. The said transmission module 172 still can comprise: a second scheduling sub-module 185, which is configured to schedule the service data flow on each logical channel according to a QoS scope corresponding to each logical channel in a packet data convergence layer. The said transmission module 172 still can comprise: a second sending module 186, which is configured to send the service data flow by means of Medium Access Control packet data unit, wherein a structure of the Medium Access Control packet data unit is as below: a service data unit in the Medium Access Control packet data unit carrying a QoS scope identifier and the service data flow with the QoS requirement being within the QoS scope indicated by the QoS scope identifier.

What needs to be explained is, the adoption of the method for transmitting the terminal service flow implemented by the wireless relay system in the present embodiment refers to the specific description of said method in the embodiment, and will not be described here any more.

Figure 19:
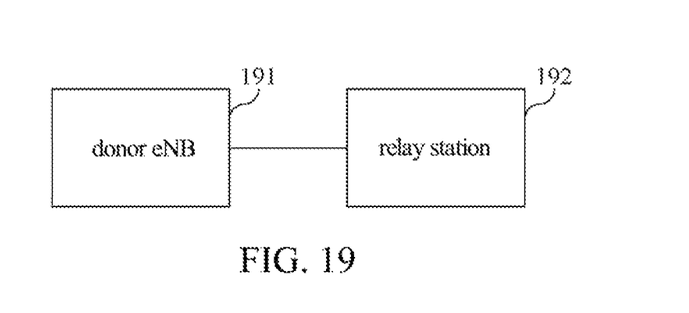
FIG. 19 is a structural schematic diagram of the radio relay system in an embodiment of the present invention.

As shown in FIG. 19, the radio relay system in the embodiment of the present invention comprises the donor eNB 191 and the relay station 192 which are connected by the backhaul link. Wherein, the donor eNB 191 is configured to set a logical channel on the backhaul link for each service data flow of each UE of the relay station 192, and transmit each service data flow of each UE on the set logical channel; and the relay station 192 is configured to transmit each service data flow of each UE on the logical channel set by the donor eNB 191.

The said donor eNB 191 is still configured to: allocate a logical channel for each service data flow of each UE of the relay station 192, and schedule the service data flow on each logical channel in medium access control according to the QoS requirement of the service data flow corresponding to each logical channel; different service data flows of each UE of the relay station 192 corresponds to the logical channel one by one, and a logical channel identifier is a combination of a UE identifier and a service identifier; the relay station 192 is further configured to schedule the service data flow on each logical channel according to the QoS requirement of the service data flow corresponding to each logical channel.

The eNB and the relay station 192 still are configured to to send the service data flow by means of Medium Access Control packet data unit; a structure of the Medium Access Control packet data unit is one of the following structures: a Medium Access Control sub-header in the Medium Access Control packet data unit carrying the logical channel identifier, a service data unit corresponding to the Medium Access Control sub-header carrying the service data flow on the logical channel corresponding to the logical channel identifier; the Medium Access Control sub-header in the Medium Access Control packet data unit comprising a UE sub-header and a service sub-header, the UE sub-header carrying the UE identifier, the service sub-header carrying the service identifier, a service data unit corresponding to the Medium Access Control sub-header carrying the service data flow on the logical channel corresponding to the UE identifier and the service identifier; and a Medium Access Control sub-header in the Medium Access Control packet data unit carrying a UE identifier, a service data unit corresponding to the Medium Access Control sub-header carrying the service identifier of the UE indicated by the UE identifier and the service data flow and the length of service data flow corresponding to the service identifier.

The said donor eNB 191 and the said relay station 192 are still configured to map one or more different service data flows with a QoS requirement being in an identical scope of QoS to an identical logical channel, schedule the service data flow on each logical channel according to a QoS scope corresponding to each logical channel in a packet data convergence layer.

The said donor eNB 191 and the said relay station 192 are still configured to send the service data flow by means of Medium Access Control packet data unit, wherein a structure of the Medium Access Control packet data unit is as below: the service data unit in the Medium Access Control packet data unit carrying a QoS scope identifier and a service data flow with the QoS requirement being in the QoS scope indicated by the QoS scope identifier.

What needs to be explained is, the adoption of the method for transmitting the terminal service flow implemented by the wireless relay system in the present embodiment refers to the specific description of said method in the embodiment, and will not be described here any more.

The foregoing is only the preferable embodiments in the present invention, and it is not used for limiting the invention, for the skilled in the art, the present invention can have various changes and variation. Within the spirit and principle of the present invention, any modification, equivalent alternation, improvement and so on should all be included in the scope of protection of the present invention.

Industrial Applicability

A method, donor eNB and radio relay system for realizing service flow transmission of a terminal are provided in the present invention, wherein a relay station is connected to the donor eNB through a backhaul link, and a scheme for transmitting the service data flow on the backhaul link is: the relay station and the donor eNB transmit each service data flow of each UE on a logical channel set by the donor eNB, thereby when the Relay is configured as a scheduled entity in a Un interface, the problem that the QoS requirement of each service of UE of the Relay can not be satisfied is resolved, so that when the Relay is configured to be a scheduled entity in a Un interface, the QoS requirement of each service of UE of the relay can be satisfied.

What we claim is:

1. A method for transmitting a service flow of a user equipment (UE), comprising:

a relay station being connected to a donor eNB through a backhaul link, the donor eNB allocating a logical channel for each service data flow of each UE of the relay station, wherein different service data flows of each UE of the relay station correspond to the logical channels one by one, and a logical channel identifier is a combination of a UE identifier and a service identifier, or one or more different service data flows with a Quality of Service (QoS) requirement being within an identical QoS scope are mapped by the donor eNB to an identical logical channel, wherein the QoS scope refers to an identical QoS or QoS with an identical subset of parameters, which is determined by the donor eNB;

the service data flow being transmitted on the backhaul link by means of the relay station and the donor eNB transmitting each service data flow of each UE on a logical channel set by the donor eNB.

2. The method according to claim 1, wherein, the step of the relay station and the donor eNB transmitting each service data flow of each UE on a logical channel set by the donor eNB further comprises:
the donor eNB and the relay station scheduling the service data flow on each logical channel according to a Quality of service (QoS) requirement of the service data flow corresponding to each logical channel.

3. The method according to claim 1, wherein when different service data flows of each UE of the relay station correspond to the logical channels one by one, and a logical channel identifier is a combination of a UE identifier and a service identifier, the step of the relay station and the donor eNB transmitting each service data flow of each UE on a logical channel set by the donor eNB comprises:
the base station or the relay station sending the service data flow by means of Medium Access Control packet data unit, wherein a structure of the Medium Access Control packet data unit is one of the following structures:
a Medium Access Control sub-header in the Medium Access Control packet data unit carrying the logical channel identifier, a service data unit corresponding to the Medium Access Control sub-header carrying a service data flow on a logical channel corresponding to the logical channel identifier;
a Medium Access Control sub-header in the Medium Access Control packet data unit comprising a UE sub-header and a service sub-header, the UE sub-header carrying the UE identifier, the service sub-header carrying the service identifier, a service data unit corresponding to the Medium Access Control sub-header carrying a service data flow on a logical channel corresponding to the UE identifier and the service identifier; and
a Medium Access Control sub-header in the Medium Access Control packet data unit carrying a UE identifier, a service data unit corresponding to the Medium Access Control sub-header carrying the service identifier of the UE indicated by the UE identifier and the service data flow and a length of the service data flow corresponding to the service identifier.

4. The method according to claim 2, wherein, the step of the donor eNB and the relay station scheduling the service data flow on each logical channel according to a QoS requirement of the service data flow corresponding to each logical channel comprises:
the donor eNB and the relay station scheduling the service data flow on each logical channel according to the QoS scope corresponding to each logical channel.

5. The method according to claim 1, wherein when one or more different service data flows with a Quality of Service (QoS) requirement being within an identical QoS scope are mapped by the donor eNB to an identical logical channel, the step of the relay station and the donor eNB transmitting each service data flow of each UE on a logical channel set by the donor eNB comprises:
the base station or the relay station sending the service data flow by means of Medium Access Control packet data unit, wherein a structure of the Medium Access Control packet data unit is as below: the service data unit in the Medium Access Control packet data unit carrying a QoS scope identifier and a service data flow with the QoS requirement being in the QoS scope indicated by the QoS scope identifier.

6. A donor eNB, which is connected to a relay station through a backhaul link, comprising:
a setting module, which is configured to set a logical channel on the backhaul link for each service data flow of each UE of the relay station; and
a transmission module, which is connected to the setting module, and is configured to transmit each service data flow of each UE on the set logical channel;
wherein the setting module and the transmission module work in a first mode or in a second mode,
in the first mode:
the setting module comprises: a first allocating sub-module, which is configured to allocate a logical channel for each service data flow of each UE of the relay station, so as to make different service data flows of each UE of the relay station correspond to the logical channels one by one, and wherein a logical channel identifier is a combination of a UE identifier and a service identifier;
the transmission module comprises: a first scheduling sub-module, which is configured to schedule the service data flow on each logical channel in medium access control according to a QoS requirement of the service data flow corresponding to each logical channel; and
in the second mode:
the setting module comprises: a second allocating sub-module, which is configured to allocate a logical channel for each service data flow of each UE of the relay station, and map one or more different service data flows with a QoS requirement being within an identical QoS scope to an identical logical channel;
the transmission module comprises: a second scheduling sub-module, which is configured to schedule the service data flow on each logical channel according to a QoS scope corresponding to each logical channel in a packet data convergence layer;
wherein the QoS scope refers to an identical QoS or QoS with an identical subset of parameters, which is determined by the donor eNB.

7. The donor eNB according to claim 6, wherein, the transmission module in the first mode further comprises:
a first sending module, which is configured to send the service data flow by means of Medium Access Control packet data unit, wherein a structure of the Medium Access Control packet data unit is one of the following structures:
a Medium Access Control sub-header in the Medium Access Control packet data unit carrying the logical channel identifier, a service data unit corresponding to the Medium Access Control sub-header carrying the service data flow on the logical channel corresponding to the logical channel identifier;
a Medium Access Control sub-header in the Medium Access Control packet data unit comprising a UE sub-header and a service sub-header, the UE sub-header carrying the UE identifier, the service sub-header carrying the service identifier, a service data unit corresponding to the Medium Access Control sub-header carrying a service data flow on a logical channel corresponding to the UE identifier and the service identifier; and
a Medium Access Control sub-header in the Medium Access Control packet data unit carrying a UE identifier, a service data unit corresponding to the Medium Access Control sub-header carrying the service identifier of the UE indicated by the UE identifier and the service data flow and a length of the service data flow corresponding to the service identifier.

8. The donor eNB according to claim 6, wherein, the transmission module in the second mode further comprises:

a second sending module, which is configured to send the service data flow by means of Medium Access Control packet data unit, wherein a structure of the Medium Access Control packet data unit is as below: a service data unit in the Medium Access Control packet data unit carrying a QoS scope identifier and the service data flow with the QoS requirement being within the QoS scope indicated by the QoS scope identifier.

9. A radio relay system for transmitting a service flow of a UE, comprising a donor eNB and a relay station which are connected through a backhaul link;

wherein, the donor eNB is configured to set a logical channel on the backhaul link for each service data flow of each UE of the relay station, and transmit each service data flow of each UE on the set logical channel; and the relay station is configured to transmit each service data flow of each UE on the logical channel set by the donor eNB;

the donor eNB and the relay station work in a first mode or in a second mode, in the first mode:

the donor eNB is further configured to: allocate a logical channel for each service data flow of each UE of the relay station, and schedule the service data flow on each logical channel in medium access control according to a QoS requirement of the service data flow corresponding to each logical channel; make different service data flows of each UE of the relay station correspond to the logical channels one by one, and wherein a logical channel identifier is a combination of a UE identifier and a service identifier;

the relay station is further configured to schedule the service data flow on each logical channel according to the QoS requirement of the service data flow corresponding to each logical channel; and in the second mode:

the donor eNB and the rela station are further configured to ma one or more different service data flows with a QoS requirement being within an identical QoS scope to an identical logical channel, schedule the service data flow on each logical channel according to a QoS scope corresponding to each logical channel in a packet data convergence layer;

wherein the QoS scope refers to an identical QoS or QoS with an identical subset of parameters, which is determined by the donor eNB.

10. The radio relay system according to claim 9, wherein in the first mode, the eNB and the relay station are further configured to send the service data flow by means of Medium Access Control packet data unit;

a structure of the Medium Access Control packet data unit is one of the following structures:

a Medium Access Control sub-header in the Medium Access Control packet data unit carrying the logical channel identifier, a service data unit corresponding to the Medium Access Control sub-header carrying the service data flow on a logical channel corresponding to the logical channel identifier;

a Medium Access Control sub-header in the Medium Access Control packet data unit comprising a UE sub-header and a service sub-header, the UE sub-header carrying the UE identifier, the service sub-header carrying the service identifier, a service data unit corresponding to the Medium Access Control sub-header carrying the service data flow on a logical channel corresponding to the UE identifier and the service identifier; and a Medium Access Control sub-header in the Medium Access Control packet data unit carrying a UE identifier, a service data unit corresponding to the Medium Access Control sub-header carrying the service identifier of the UE indicated by the UE identifier and the service data flow and a length of service data flow corresponding to the service identifier.

11. The radio relay system according to claim 9, wherein in the second mode, the donor eNB and the relay station are further configured to send the service data flow by means of Medium Access Control packet data unit, wherein a structure of the Medium Access Control packet data unit is as below: the service data unit in the Medium Access Control packet data unit carrying a QoS scope identifier and a service data flow with the QoS requirement being in the QoS scope indicated by the QoS scope identifier.

12. The method according to claim 4, wherein, the step of the relay station and the donor eNB transmitting each service data flow of each UE on a logical channel set by the donor eNB comprises:

the base station or the relay station sending the service data flow by means of Medium Access Control packet data unit, wherein a structure of the Medium Access Control packet data unit is as below: the service data unit in the Medium Access Control packet data unit carrying a QoS scope identifier and a service data flow with the QoS requirement being in the QoS scope indicated by the QoS scope identifier.

* * * * *